United States Patent
Bakke

(10) Patent No.: US 11,234,052 B2
(45) Date of Patent: *Jan. 25, 2022

(54) VIDEO PROVIDING TEXTUAL CONTENT SYSTEM AND METHOD

(71) Applicant: Netzyn, Inc., Richardson, TX (US)

(72) Inventor: Steve Bakke, Dallas, TX (US)

(73) Assignee: Netzyn, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/124,911

(22) Filed: Dec. 17, 2020

(65) Prior Publication Data

US 2021/0211772 A1 Jul. 8, 2021

Related U.S. Application Data

(63) Continuation of application No. 15/387,195, filed on Dec. 21, 2016, now Pat. No. 10,904,625, which is a continuation of application No. 13/692,349, filed on Dec. 3, 2012, now Pat. No. 9,565,476.

(60) Provisional application No. 61/566,319, filed on Dec. 2, 2011.

(51) Int. Cl.
| | |
|---|---|
| *H04N 21/472* | (2011.01) |
| *H04N 21/422* | (2011.01) |
| *H04N 21/84* | (2011.01) |
| *H04N 21/845* | (2011.01) |

(52) U.S. Cl.
CPC ..... *H04N 21/472* (2013.01); *H04N 21/42224* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 5,535,008 A | * | 7/1996 | Yamagishi | G06T 9/004 386/248 |
| 5,602,956 A | * | 2/1997 | Suzuki | H04N 21/4402 386/346 |
| 6,204,887 B1 | * | 3/2001 | Hiroi | G09G 5/14 348/565 |
| 6,374,314 B1 | * | 4/2002 | Darnell | H04L 29/06 710/29 |
| 6,573,907 B1 | * | 6/2003 | Madrane | G11B 27/034 715/719 |
| 6,654,541 B1 | * | 11/2003 | Nishi | H04N 21/654 386/240 |
| 6,856,997 B2 | * | 2/2005 | Lee | H04N 21/2387 |

(Continued)

*Primary Examiner* — An Son P Huynh
(74) *Attorney, Agent, or Firm* — The Law Firm of H. Dale Langley, Jr., PC

(57) ABSTRACT

A system for interacting with a video includes a processor, a video decoder communicatively connected to the processor, a storage communicatively connected to the demultiplexer, the storage contains at least one video file having more than one video frame, at least one of the video frame including at least one respective metadata segment of the video frame, and an input device communicatively connected to the processor. The processor, responsive to the input device, processes the at least one of the video frame including the at least one respective metadata segment, controlling selection of another of the more than one video frame for the video decoder.

8 Claims, 9 Drawing Sheets

(56) References Cited

U.S. PATENT DOCUMENTS

| | | | | |
|---|---|---|---|---|
| 7,231,516 | B1* | 6/2007 | Sparrell | H04N 5/783 348/E7.056 |
| 7,890,985 | B2* | 2/2011 | Bowra | H04L 65/602 725/88 |
| 8,079,054 | B1* | 12/2011 | Dhawan | H04N 21/812 725/105 |
| 8,631,453 | B2* | 1/2014 | Sadja | H04N 21/8456 725/110 |
| 8,776,150 | B2* | 7/2014 | Tian | H04N 21/632 725/88 |
| 2001/0005400 | A1* | 6/2001 | Tsujii | G11B 27/28 375/240.29 |
| 2001/0041053 | A1* | 11/2001 | Abecassis | H04N 7/17354 386/291 |
| 2001/0043794 | A1* | 11/2001 | Akiba | H04N 9/8042 386/239 |
| 2002/0034373 | A1* | 3/2002 | Morita | G06F 16/739 386/278 |
| 2002/0062313 | A1* | 5/2002 | Lee | H04N 21/8455 |
| 2002/0069218 | A1* | 6/2002 | Sull | G06F 16/7847 715/202 |
| 2002/0097984 | A1* | 7/2002 | Abecassis | H04N 21/4722 386/344 |
| 2002/0144262 | A1* | 10/2002 | Plotnick | H04N 21/252 725/32 |
| 2002/0183870 | A1* | 12/2002 | Misawa | G06F 8/30 700/86 |
| 2003/0004992 | A1* | 1/2003 | Matsui | H04N 21/85406 715/201 |
| 2003/0149983 | A1* | 8/2003 | Markel | H04N 21/8543 725/51 |
| 2004/0161033 | A1* | 8/2004 | Notoya | H04N 19/46 375/240.01 |
| 2004/0196906 | A1* | 10/2004 | Gordon | H04N 21/26283 375/240.12 |
| 2004/0234240 | A1* | 11/2004 | Kurosawa | G11B 27/329 386/291 |
| 2005/0069289 | A1* | 3/2005 | Kusunoki | G11B 27/036 386/232 |
| 2005/0137958 | A1* | 6/2005 | Huber | H04N 21/812 705/37 |
| 2006/0015409 | A1* | 1/2006 | Kato | H04H 60/33 705/26.1 |
| 2006/0265731 | A1* | 11/2006 | Matsuda | H04N 21/440281 725/131 |
| 2007/0009099 | A1* | 1/2007 | Kikuchi | H04N 21/4728 380/203 |
| 2007/0104369 | A1* | 5/2007 | Weatherhead | H04H 60/59 382/181 |
| 2007/0177466 | A1* | 8/2007 | Ando | H04N 21/4147 369/13.01 |
| 2007/0201819 | A1* | 8/2007 | Sung | H04N 5/783 386/220 |
| 2007/0230897 | A1* | 10/2007 | Nagase | G11B 20/10 386/356 |
| 2007/0268406 | A1* | 11/2007 | Bennett | H04N 7/0122 348/565 |
| 2008/0019445 | A1* | 1/2008 | Aono | H04N 19/172 375/240.12 |
| 2008/0122796 | A1* | 5/2008 | Jobs | G06F 3/04883 345/173 |
| 2008/0127253 | A1* | 5/2008 | Zhang | H04N 21/478 725/35 |
| 2008/0141091 | A1* | 6/2008 | Kalluri | H04N 21/8455 714/748 |
| 2009/0031419 | A1* | 1/2009 | Laksono | H04N 21/6175 726/21 |
| 2009/0070324 | A1* | 3/2009 | Yoshino | H04N 21/8583 |
| 2009/0158214 | A1* | 6/2009 | Arnold | G06F 16/44 715/830 |
| 2009/0164904 | A1* | 6/2009 | Horowitz | G06F 16/78 715/723 |
| 2009/0282444 | A1* | 11/2009 | Laksono | H04N 21/2387 725/89 |
| 2010/0017474 | A1* | 1/2010 | Kandekar | H04N 21/4751 709/205 |
| 2010/0050209 | A1* | 2/2010 | Price | H04N 19/61 725/45 |
| 2010/0226377 | A1* | 9/2010 | Ogasahara | H04L 12/437 370/400 |
| 2011/0282906 | A1* | 11/2011 | Wong | G06F 16/7867 707/780 |
| 2012/0090009 | A1* | 4/2012 | Cook | H04N 21/4312 725/52 |
| 2012/0128241 | A1* | 5/2012 | Jung | H04N 21/84 382/165 |
| 2012/0246685 | A1* | 9/2012 | Fink | G06Q 30/0241 725/60 |
| 2012/0315011 | A1* | 12/2012 | Messmer | H04N 21/84 386/230 |
| 2012/0321273 | A1* | 12/2012 | Messmer | H04N 13/128 386/224 |
| 2013/0071095 | A1* | 3/2013 | Chauvier | H04N 21/47217 386/343 |

* cited by examiner

VIDEO PROVIDING TEXTUAL CONTENT SYSTEM AND METHOD

CROSS-REFERENCE TO RELATED APPLICATIONS

The present application is a continuation and has benefit of priority of U.S. patent application Ser. No. 15/387,195 titled "Video Providing Textual Content System and Method", filed Dec. 21, 2016, which priority application is a continuation of U.S. patent application Ser. No. 13/692,349, titled Video Providing Textual Content System and Method", filed Dec. 3, 2012, and issued on Aug. 15, 2017 as U.S. Pat. No. 9,736,247 (which is a conversion of and has benefit of U.S. Provisional Patent Application Ser. No. 61/566,319, titled "Video Providing Textual Content System and Method," filed Dec. 2, 2011), The priority application Ser. No. 15/387,195 is co-pending and has at least one same inventor of the present application.

TECHNICAL FIELD

The invention generally relates to devices that play standard video that is either stored locally on the device or streamed over a network, and more specifically relates to providing devices with video for display of textual content such as used to provide electronic versions of newspapers, magazines or books.

BACKGROUND

Over the last few years there has been an explosion in creating electronic versions of books, magazines and newspapers. This electronic textual content is viewed using a specific user device, such as an e-reader or viewed using standard user devices such as personal computers (PCs), laptops, smartphones or tablets. This electronic content is provided to the user through various means: 1) industry standard formatted files such as ePub or pdf, 2) proprietary format files such as Amazon Kindle or Sony's eBeB, or 3) software applications that run on a particular device such as a Time Magazine iOS application for use on an iPod or iPad.

Video, such as may be processed from a file stored in or communicatively connected to a device or from network streamed data received by the device from a remote source, is comprised of "frames." These frames are processed, in sequence over time, for display of respective images of the scenes. A digital data file or streamed data set of video is generally encoded as two types of video frames, I frames and P frames. The I frames can be decoded without reference to any other frames, but the P frames are decoded with reference to previously decoded I frames and P frames. The I frames usually take considerably more storage then the P frames. Therefore, to save on storage requirements, it is usually desirable to have more of the P frames and fewer of the I frames. The video includes one or more "header" containing metadata which, together with any inputs operative by the metadata, control the sequencing of the frames to display respective images to represent the applicable moving scene of the video. Because the P frames are decoded with reference to previously decoded I frames and P frames, random access to any given frame of the video conventionally requires that previous I frames and P frames must first be decoded.

It would therefore be a significant improvement in the art and technology to provide systems and methods for processing video for display of textual content, such as for electronic versions of newspapers, magazines, books or other purposes, with substantially random selectability of next frame for display from among other frames of the video.

SUMMARY

Embodiments of the invention include video content that when displayed on a user device appears to the user as a typical electronic version of a book, newspaper and magazine. The video content includes a set of frames, each frame viewed one at a time in sequence, with each frame being a page and with capability for access both sequential and non-sequential (i.e., out of regular sequence) frames/pages. The user device can have limited processing power, one or more inputs, a source of the video, a video decoder, and a display. The video format of each frame includes standard video segment and audio segment, together along with one or more metadata segment. The video is processed/played one frame at a time and the metadata that is attached to each video frame is used to provide a list of possible frame numbers to access and display next. Each metadata segment includes logical criteria which, if met, results in an action performed. For example, the action may include next access to a given frame of the video, and processing and display of that frame. Logical criteria of the metadata segment may include, for example, receipt of input of a key stroke, mouse click/movement, touch gesture and possibly the area of the screen, and others. The input is processed together with the metadata segment to yield a next frame to goto, file to goto, a type of transition from current image display to the next image display, area of the screen display where the next frame is displayed (which generally is the entire display, but not always) and others. The video can be uniquely displayed in each device. For example, device specifications, such as display size, input devices and speed of processing by decoder can dictate display, and user preferences of the device, such as font size, color, language and others, can dictate video output by the device. Embodiments also provide concurrent display of multiple videos on a display, wherein the videos are overlaid or non-overlaid in the display. In certain embodiments, the video can invoke other video(s). A main or master video provides a selectable list to other video(s). On invoking a selected video from the master video, control can be returned to the master video.

An embodiment of the invention includes a system for interacting with a video. The system includes a processor, a video decoder communicatively connected to the processor, a storage communicatively connected to the demultiplexer, the storage contains at least one video file having more than one video frame, at least one of the video frame including at least one respective metadata segment of the video frame, and an input device communicatively connected to the processor, wherein the processor, responsive to the input device, processes the at least one of the video frame including the at least one respective metadata segment of the video frame, controlling selection of another of the more than one video frame for the video decoder.

Another embodiment of the invention includes a video file of respective video frames. The video frames are respectively processable by a processor to deliver a video image to a display. The video file includes a respective video segment of each video frame, and a respective metadata logic code segment of each video frame, the respective metadata logic code segment of each video frame processable, responsive to interactive input received by the processor, for controlling the video in the display.

Yet another embodiment of the invention includes a method of processing a video file. The method includes demultiplexing the video file to obtain a first video frame, the first video frame includes a video segment and a metadata segment, decoding the first video frame, processing the video segment and the metadata segment of the first video frame, displaying an image in respect of the video segment of the step of processing, receiving an input logically operative to the metadata segment of the step of processing, selecting a second video frame for the step of decoding in response to the step of receiving, and repeating the steps of decoding, processing and displaying for the second video frame.

Another embodiment of the invention includes a system for displaying a video of successive images from a video file. The system includes a demultiplexer for splitting the video file into at least one respective video frame for each respective image of the video, each of the at least one video frame including a video segment and a metadata segment, a decoder communicatively connected to the demultiplexer, for rendering each of the at least one respective video frame for processing, a processor communicatively connected to the decoder, for processing the video segment and the metadata segment, respectively, of each of the at least one video frame, respectively, a display communicatively connected to the processor, for displaying the successive images, each video segment of each video frame displayable as a respective one of the successive images, and an input device communicatively connected to the processor, for receiving input operative to the processor in processing the metadata segment. The processor selectively calls a next one of the successive images, responsive to processing the metadata segment and input received from the input device.

Yet another embodiment of the invention includes a method for play of an interactive video, the interactive video includes a metadata segment associated with a video segment of each frame. The method includes decoding the interactive video, first processing the video segment and the metadata segment of a first frame of the interactive video, first receiving a first input directive to the step of processing the video segment and the metadata segment of the first frame, first discontinuing the step of first processing the video segment and the metadata segment of the first frame, first calling a second frame of the video, in response to the steps of first processing and first receiving, second processing the video segment and the metadata segment of the second frame of the interactive video, second receiving a second input directive to the step of second processing the video segment and the metadata segment of the second frame, second discontinuing the step of second processing the video segment and the metadata segment of the second frame, second calling a third frame of the video, in response to the steps of second processing and second receiving, third processing the video segment and the metadata segment of the third frame of the interactive video, third receiving a third input directive to the step of third processing the video segment and the metadata segment of the third frame, and third discontinuing the step of processing the video segment and the metadata segment of the third frame of the interactive video.

BRIEF DESCRIPTION OF THE DRAWINGS

The present invention is illustrated by way of example and not limitation in the accompanying figures, in which like references indicate similar elements, and in which.

DETAILED DESCRIPTION

In this disclosure, the term "video" is used to refer to an encoded or decoded digital data file or streamed digital data set, which is processable to render a sequence of displayed images representing respective scenes in motion. By way of background, video is comprised of "frames" which are processed for display in sequence over time of respective images of the scenes. A digital data file or streamed data set of video is generally encoded as two types of video frames, I frames and P frames. The I frames can be decoded without reference to any other frames, but the P frames are decoded with reference to previously decoded I frames and P frames. The I frames usually take considerably more storage then the P frames. Therefore, to save on storage requirements, it is usually desirable to have more of the P frames and fewer of the I frames. The frames of the video include a video segment, and may also include an audio segment. The frames also include one or more "header" containing metadata which, together with any inputs, control the sequencing of the frames to display respective images representing the moving scene of the video.

Figure 1:
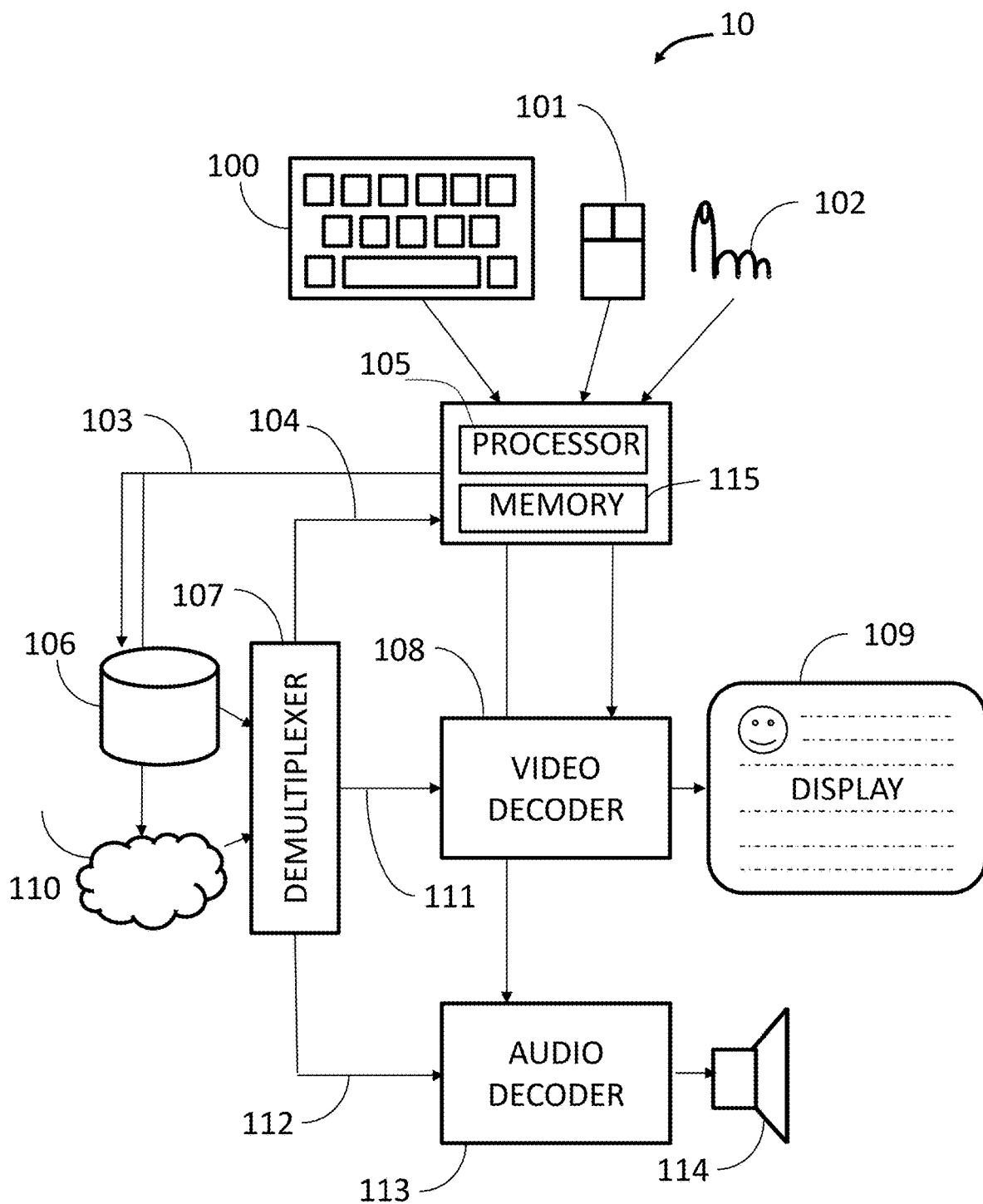
FIG. 1 illustrates an example video player device for display of a video, according to certain embodiments of the invention.

Referring to FIG. 1, according to certain embodiments, an example video player device 10, such as a device of a user having limited or other processing capability, includes a processor 105 communicatively connected to memory 115. The processor 105, in conjunction with the memory 115, controls the device 10 and its components and provides other processing. The processor 105, operating in conjunction with the memory 115, can receive input for control of processing. For example, one or more input peripheral device, such as a keyboard 100, mouse 101, touch pad or display 102, and/or other input device, is communicatively connected to the device. As will be understood, the device 10 may include any one or more of these or other input peripheral devices.

The player device 10 includes or is communicatively connected to one or more output device, for example, a display 109, a speaker 114, other output device(s), or combinations. The device 10 also includes or is communicatively connected to a demultiplexer 107 communicatively connected to the processor 105, for receiving input of video and delivering segments of the video (e.g., video segments, audio segments, and other segments, such as metadata) to applicable decoder(s). For example, a video decoder 108 of or communicatively connected to the device 10 via the processor 105 and the demultiplexer 107 receives and decodes video segments of the video to render respective frames of the video for output of corresponding successive images in the display 109. Further in the example, in the case of a video that includes audio, an audio decoder 113 of or communicatively connected to the device 10 via the processor 105 and the demultiplexer 107 receives and decodes audio segments of the video to render audio for output by the speaker 114. One or more headers of respective metadata of the video is similarly received and processed/decoded by the processor 105 and/or decoder, as applicable in the embodiment and for the video.

Depending on desired implementation, each of the demultiplexer 107, the video decoder 108 and the audio decoder 113 may be any of a computer program stored in memory and processed by the processor 105, in conjunction with the memory 115, an electrical circuit or device, another device, or combinations.

The video for processing by the device 10 is stored in a local storage 106 of or communicatively connected to the device 10, or is streamed from a remote device over a network 110 communicatively connected to the device 10, or combinations. Examples of the local storage 106 include a hard drive, flash memory device, or other memory or storage, of or communicatively connected to the device 10. Examples of the network 110 include any telecommunications network, such as a packet-switched network, which may be a wired or wireless network, including but not limited to any one or more wide area network (WAN), local area network (LAN), wireless local area network (WLAN), the Internet, virtual private network (VPN), or other network or link or combination of links or networks for communication.

In operation, the video, from either local storage 106 or the network 110, is received by a demultiplexer 107 as successive frames. The demultiplexer 107 separates different segments of each video frame, for example, video, audio and/or metadata segments of each frame, and delivers the respective segments to decoder(s) 108, 113 and/or processor 105, as may be applicable for the frame. The metadata segment of the video frame is delivered 104 by the demultiplexer 107 to the processor 105, operating in conjunction with the memory 115. The video segment of the frame is delivered 111 by the demultiplexer 107 to the video decoder 108. The audio segment is delivered 112 by the demultiplexer 107 to the audio decoder 113. Depending on desired implementation, the demultiplexer 107, the video decoder 108 and the audio decoder 113 may be a computer program stored in memory and processed by the processor 105, in conjunction with the memory 115, an electrical circuit, or combinations.

The video decoder 108 decodes the video segment of each frame of the video and outputs for display each decoded frame as a respective image in the display 109. Examples of the video decoder 108 include any industry standard decoder, such as H264, MPEG2, JPEG, or other, any proprietary decoder, or other decoder suitable for the video. The audio decoder 113 decodes the audio of each frame of the video, and delivers the decoded audio to the speaker 114 for audio output. Examples of the audio decoder 113 include any industry standard decoder such as AAC, MP3, OGG, or other, any proprietary decoder, or other decoder suitable for the video.

Further in operation, the processor 105, in conjunction with the memory 115, processes the respective metadata segment 104 (or segments, as applicable) of each frame of the video. In processing the metadata segment 104, logical determination is made by the processor 105, as dictated by the metadata segment 104, for response to any relevant input received from an input device (e.g., the keyboard 100, mouse 101, or touch pad or display 102) in order to control which of a next frame of the video should be processed and output by the display 109 and/or speaker 114. If the processor 105, during processing of the metadata segment 104 of a then-current frame of the video, receives an applicable input (such as by a user to an applicable input device) as per the metadata segment 104, the processor 105 responds with a frame request 103. The frame request 103 is communicated to the local storage 106 or remote source of the network 110, whichever is then supplying the video. Responsive to the frame request 103, the next frame of the frame request 103 is next received by the demultiplexer 107 for processing. Further particulars of the metadata segment (or segments) and its processing, and inputs which, based on particulars of the metadata segment, may invoke the frame request 103, will be further described.

Figure 2:
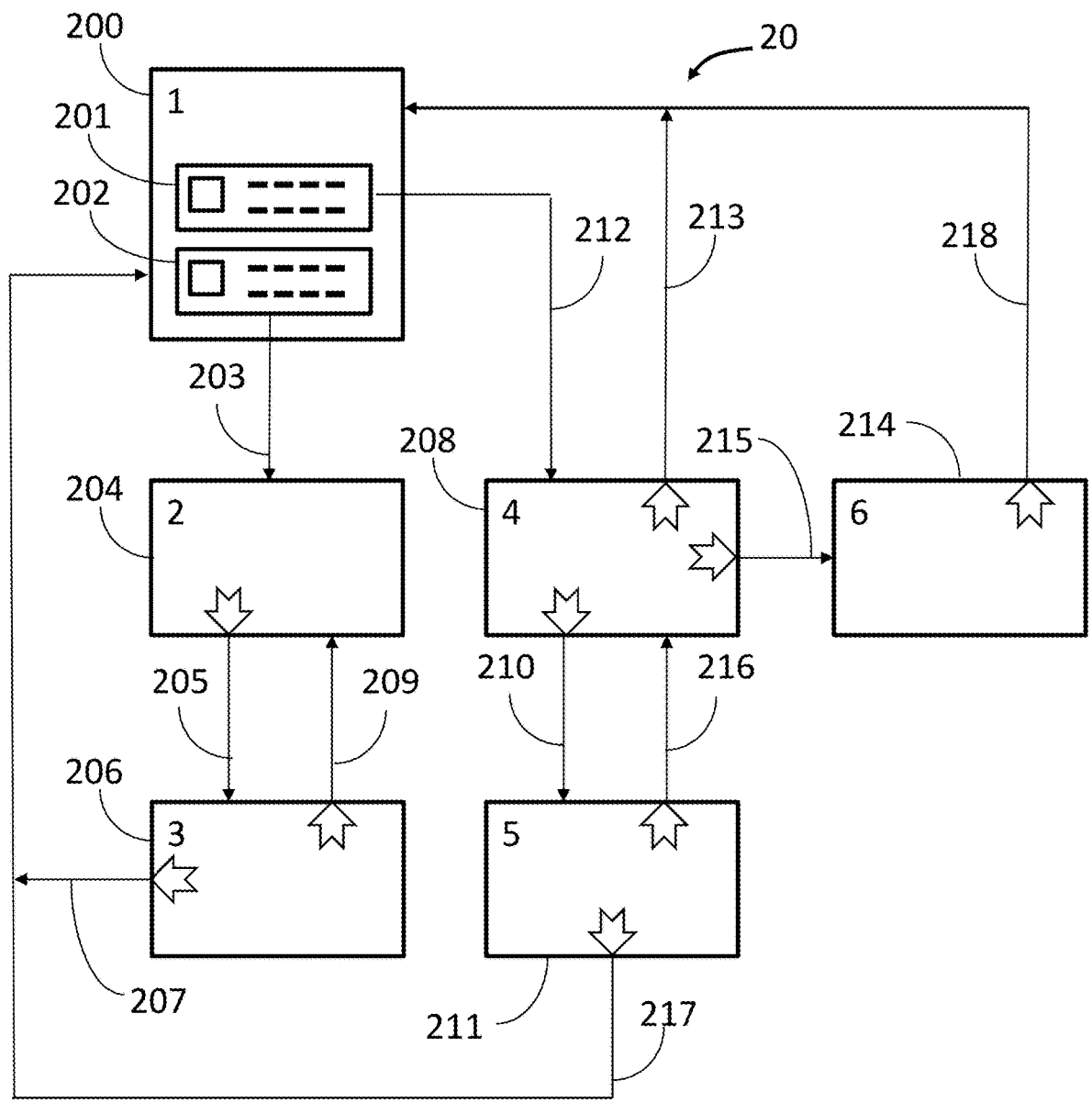
FIG. 2 illustrates an example video of six frames, each frame including respective one or more metadata segment which, when processed with input, determines selection among frames for each next frame for display, according to certain embodiments of the invention.

Referring to FIG. 2, an example video 20, for purposes of explanation but not limitation, includes six frames—frame 1 200, frame 2 204, frame 3 206, frame 4 208, frame 5 211 and frame 6 214. Each frame 200, 204, 206, 208, 211 and 216 includes one or more respective metadata segment. Each metadata segment is a code or file stored in memory and processed by the processor 105, which can receive particular input from an input device and invoke next action. For example, input of a swipe gesture to a touch pad, a click to a mouse, a keyboard entry, or the like, can invoke a next processing operations, such as processing of a next image of the video.

Further in the example, the frame 1 200 of the video includes two metadata segments 201, 202. Both metadata segments 201, 202, when processed by the processor 105 and responsive to input, for example, one or more click or touch to a specific area of a touch display or the like, invoke particular next processing operation for the video. The metadata segment 201 when invoked 212, for example purposes, by an input swipe action to a touch sensitive display, is processed to initiate a "goto" (i.e., a call or request by the processor 105 for) the frame 4 208. The metadata segment 202 when invoked 203, for example, by another swipe gesture to the display, will goto the frame 2 204.

The frame 2 204 has only one metadata segment 205, a downward swipe gesture input to the touch sensitive display in the example. When the metadata segment 205 is invoked by such input, the processor initiates a goto the frame 3 206.

The frame 3 206 has two metadata segments 209, 207, each invoked by swipe gestures to the touch sensitive display for purposes of example. An upward swipe gesture 209 to the display, for example, will goto the frame 2 204, and a left swipe gesture 207 to the display will goto the frame 1 200.

The frame 4 208 has three metadata segments 213, 215 and 210, each invoked by swipe gestures. An upward swipe gesture 213 will goto the frame 1 200, a right swipe gesture 215 will goto the frame 6 214, and a downward swipe gesture 210 will goto the frame 5 211.

The frame 5 211 has two metadata segments 216 and 217, each invoked by swipe gestures. An upward swipe gesture 216 will goto the frame 4 208, and a downward swipe gesture 217 will goto the frame 1 200.

The frame 6 214 has only one metadata segment 218, an upward swipe gesture, which when invoked will goto the frame 1 200.

Figure 3:
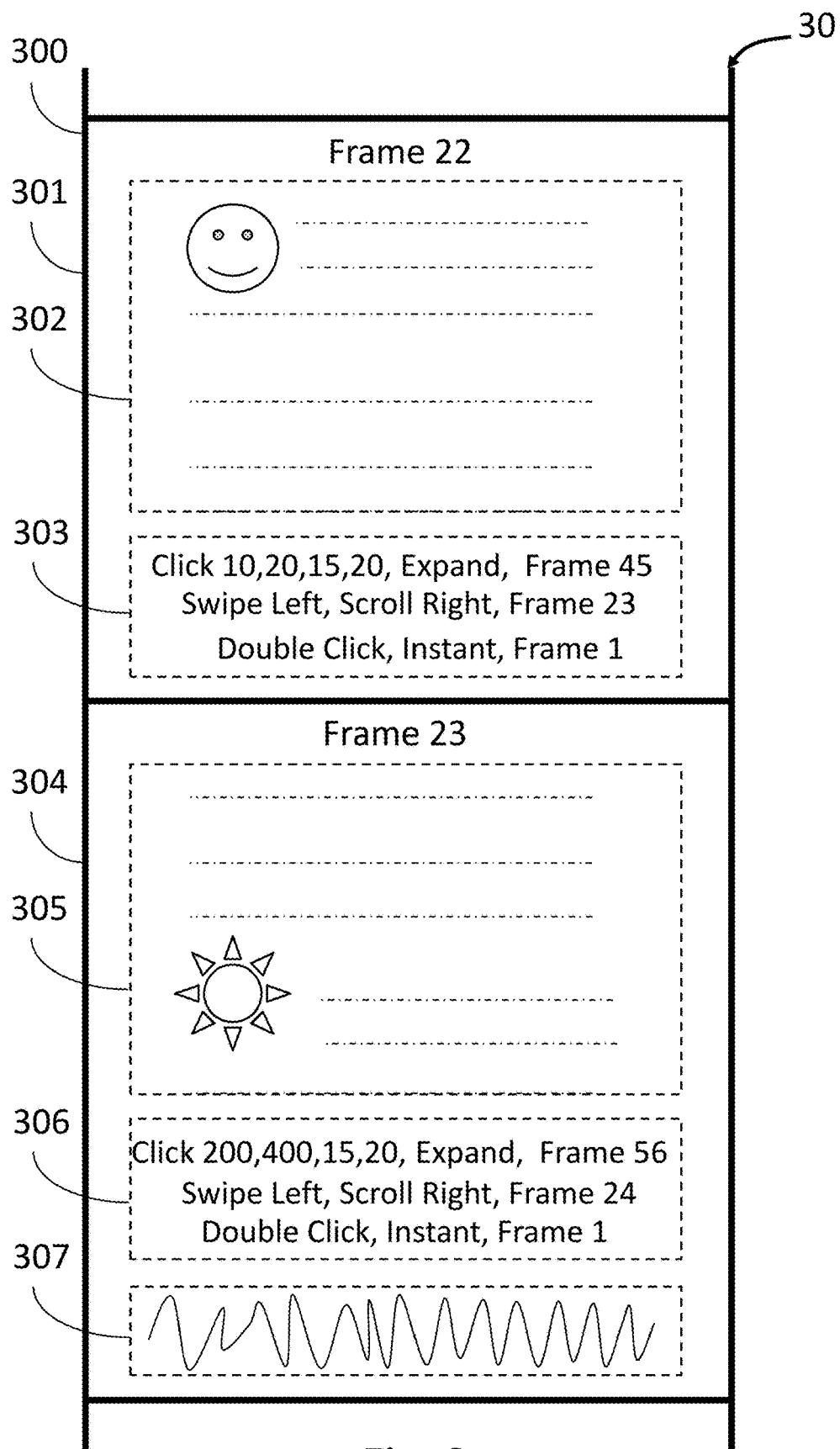
FIG. 3 illustrates another example video of two frames, each frame including video and metadata segments, and in certain instance audio segment, according to certain embodiments of the invention.

Referring to FIG. 3, another example video 30, for purposes of explanation but not limitation, includes two frames 301, 304, where each of the frames 301, 304 includes respective multiple segments (e.g., of video, metadata, and/or audio). In the example, the frame 301 includes a video segment 302 and a metadata segment 303, and the frame 304 includes a video segment 305, a metadata segment 306, and an audio segment 307. Each video segment 302, 305 of the frame 301, 304, respectively, of the video 30, in form received by a player device, for example, such as the player device 10 of FIG. 1, may be encoded according to an encoding format, for example, H264, MPEG2, JPEG, or other. The audio segment 307 of the frame 304 includes an audio code or file, encoded in AAC, MP3, or other format. The metadata segment 303, 306 of each frame 301, 304, respectively, is processed by a processor of the player device to control if/when and which of the frames 301, 304 to next goto for processing and output by the player device.

The frame 22 301 includes two segments, a video segment 302 and a metadata segment 303. The video segment 302 corresponds to a single video frame of the video 30. The metadata segment 303, associated with the frame 22 301, includes three possible logical determinants for processing by the display device in response to inputs to the display device. These determinants, responsive to input to the player device, include a click action input to a touch sensitive display (and/or other input device) of the player device, a swipe left action input to the display, and a double click action input to the display.

The frame 23 304 includes three segments of a video segment 305, a metadata segment 306 and an audio segment 307. The video segment 305 includes a single video frame of the video 30. The metadata segment 306 includes three logical determinants associated with the then-current frame 23 304, i.e., a click input, a swipe left input and a double click input. The audio segment 307 includes an audio file associated with the then-current frame 23 304.

Figure 4:
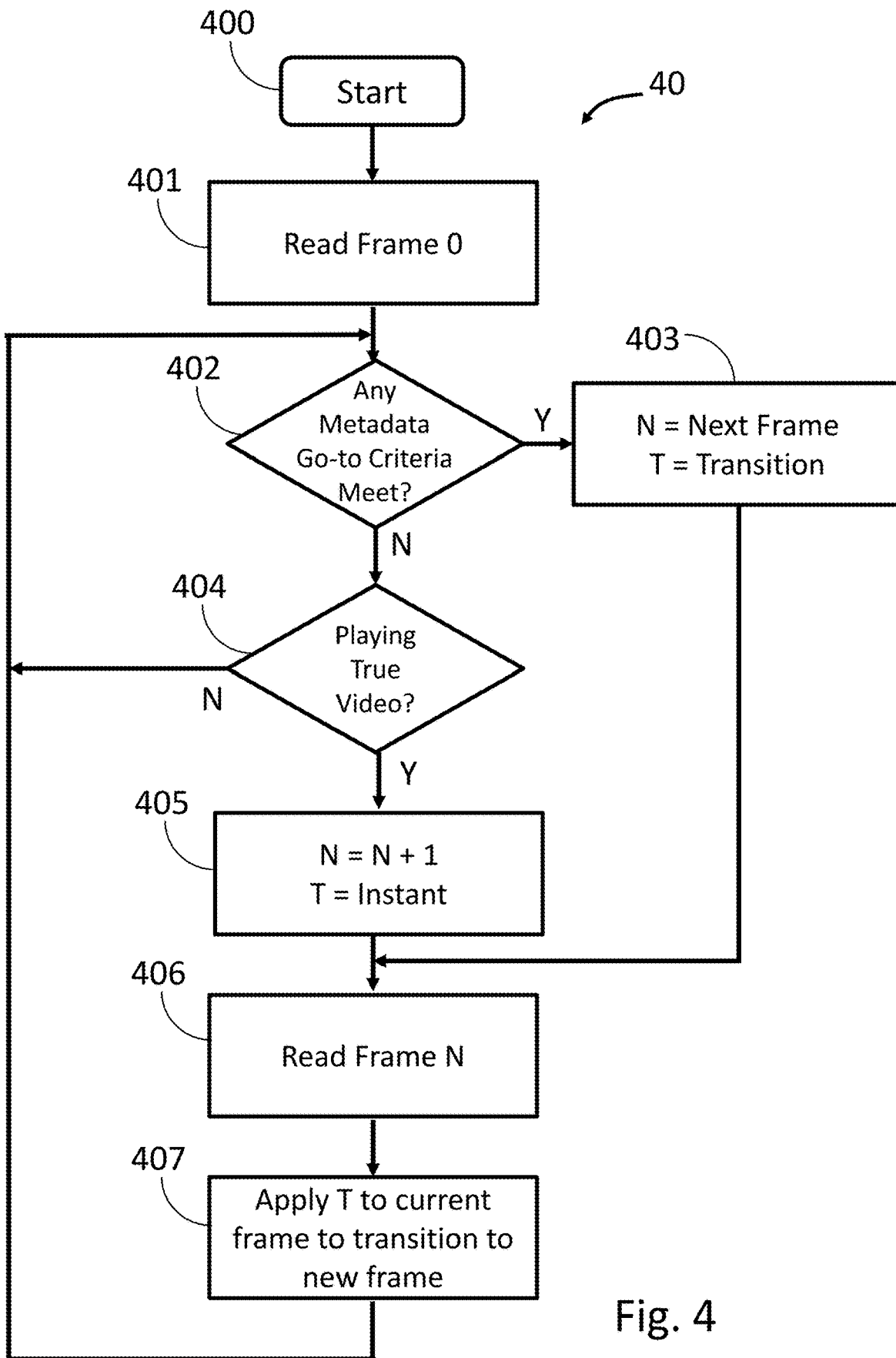
FIG. 4 illustrates a method of processing a video file by a video processing device, according to certain embodiments of the invention.

Referring to FIG. 4, a method 40 of processing a video file by a video processing device, for example, a video player device, commences with a step 400 of receiving a first frame 0 of the video by the video processing device. The video processing device may maintain the video in a local storage of the device, the video may be received from streaming over a network by the device, or otherwise.

Upon the receiving step 400, the frame 0 is read by the video processing device in a step 401. The frame 0 includes at least a video segment and a metadata segment. The metadata segment includes one or more logical determinant associated with the frame 0. If an applicable input per the metadata segment is received in a step 402 during processing of the metadata segment, the metadata segment as processed invokes in a step 403 a request by the device for a next frame of the video.

In effect, the metadata segment of the frame 0, along with any applicable input, is processed in the step 402 to determine if any goto criteria of the metadata segment is met. If any goto criteria is met, then an identifier of the frame to goto next, and the type of any transition, is saved in a step 403. If goto criteria is not met, then testing 404 is performed to check if a true video file is being played.

If true video is not being played (e.g., if the video provides text or still image and processing of the metadata segment indicates that a next frame of the video is not to be called unless any goto criteria of the metadata is met), the method returns to the step of testing 402 to determine if any goto criteria of the metadata segment is met. Display of the then-current video frame (e.g., in the case of a first frame, the frame 0) then continues until any goto criteria of the metadata segment is met.

If, on the other hand, a true video is being played (e.g., if the video—or successive frames of the video—is merely a succession of frames for providing a moving scene of images and without logical determination per any metadata segment), in a step 405, a next frame for processing is set to the then-current frame plus one (e.g., in the case of the first frame, the frame 0, plus 1, so frame 0+1) and the transition type is set to instant (i.e., the next frame, such as frame 0+1, is automatically next displayed in due course of processing the video) 405. The next frame (e.g., frame 0+1) is then read in a step 406. After that next frame is read (including, as applicable, decoded), the transition is applied in a step 407 to this next frame, which determines how this next frame is displayed. After this next frame is displayed, processing 402 in the method 40 continues with display of such next frame and processing of any metadata segment(s) associated with this next frame according to the method 40.

Figure 5:
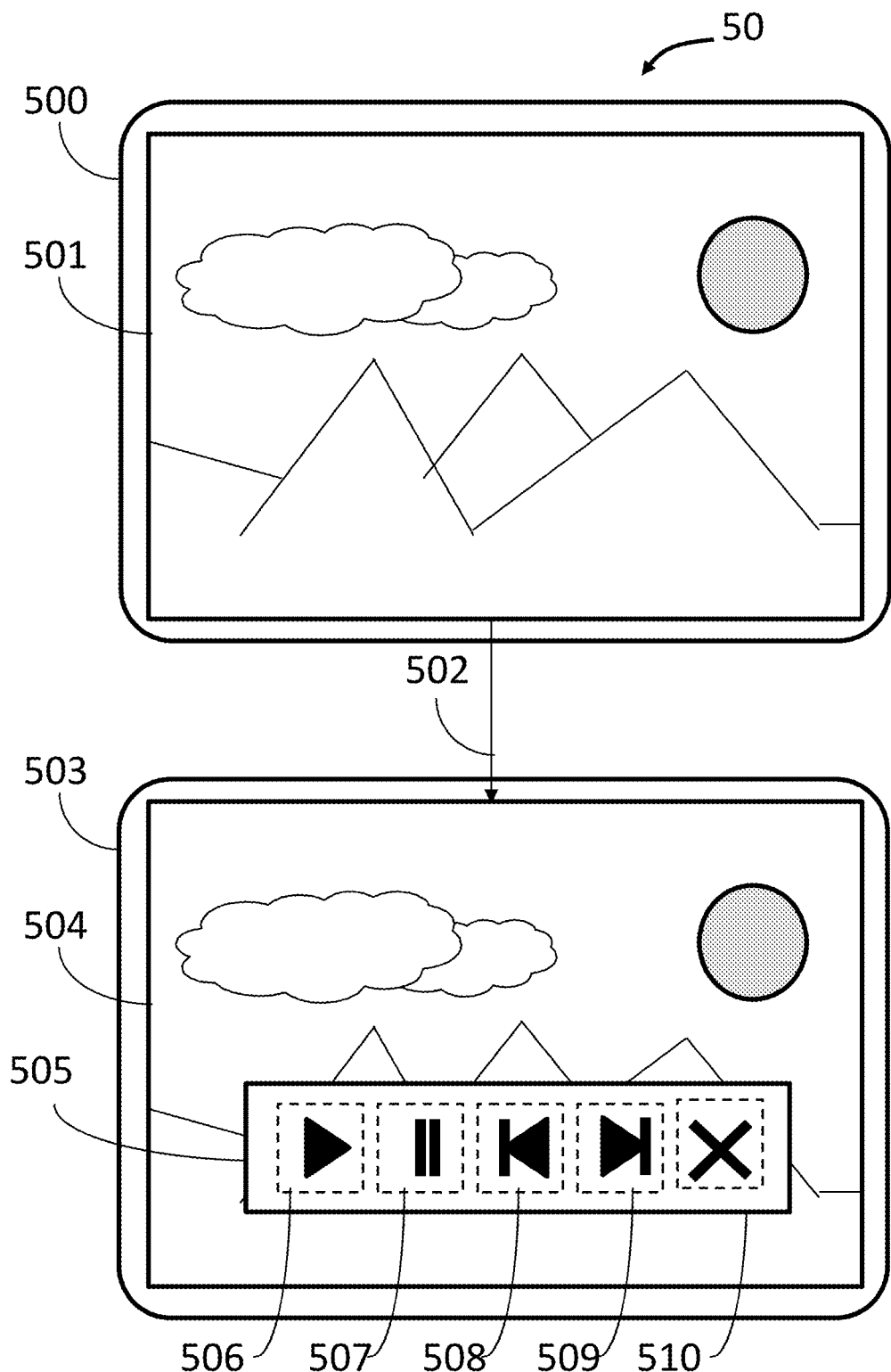
FIG. 5 illustrates example displays of two example consecutive image displays of an example video, in which images are simultaneously processed and displayed in overlaid manner, according to certain embodiments of the invention.

Referring to FIG. 5, example displays 50 of two example consecutive image displays 500, 503 of an example video are illustrated, where the second image display 503 includes a metadata segment invoked display of a second simultaneously processed video window 505 (i.e., the rectangular window of the display) overlaid atop a first simultaneously processed video window 501. The first image display 500 contains a single video content (e.g., a single frame of the video) played for display in the window 501. Responsive to processing of an applicable metadata segment of the video (e.g., of the single frame of the video) and invocation through an applicable action (e.g., a swipe to the screen) that a logical criteria per the metadata segment is met, the second image display 503, with the overlaid video window 505, is processed and displayed (in overlaid manner of the display 503). In the example, processing of the particular metadata segment, together with received input in accordance with logical determination per the metadata segment, displays (as an additional video) the video window 505 overlaid atop of the original video window 504 (which is illustrated as the video window 501 in the first display 500). The video window 505, in the example, has five display area-based click/touch input actions for invoking further processing in accordance with the metadata segment. In the example, the metadata segment includes five logical determinants, each invoked by a respective click/touch input. For example, a start button 506, stop/pause button 507, skip backward button 508, and a skip forwards button 509 display in the display 503 within the overlaid window 505. Each of the buttons 506-509 is associated with one or more metadata segment of the video, and upon input to the button (e.g., click/touch) appearing in the display 503, processing of the metadata segment associated with the applicable button causes next action in accordance with the relevant button 506-509, respectively, for the video displayed/played in the first simultaneously processed video window 501 (i.e. start video, stop/pause video, skip backward in video, or skip forward in video, as applicable). A remove button 510, invoked and operating in similar manner, causes removal of the video displayed/played in the first simultaneously processed video window 501 and the second simultaneously processed video window 505. The buttons are merely intended as examples, and other metadata segment(s) and relevant input could effect other actions and displays in the embodiments.

Figure 6:
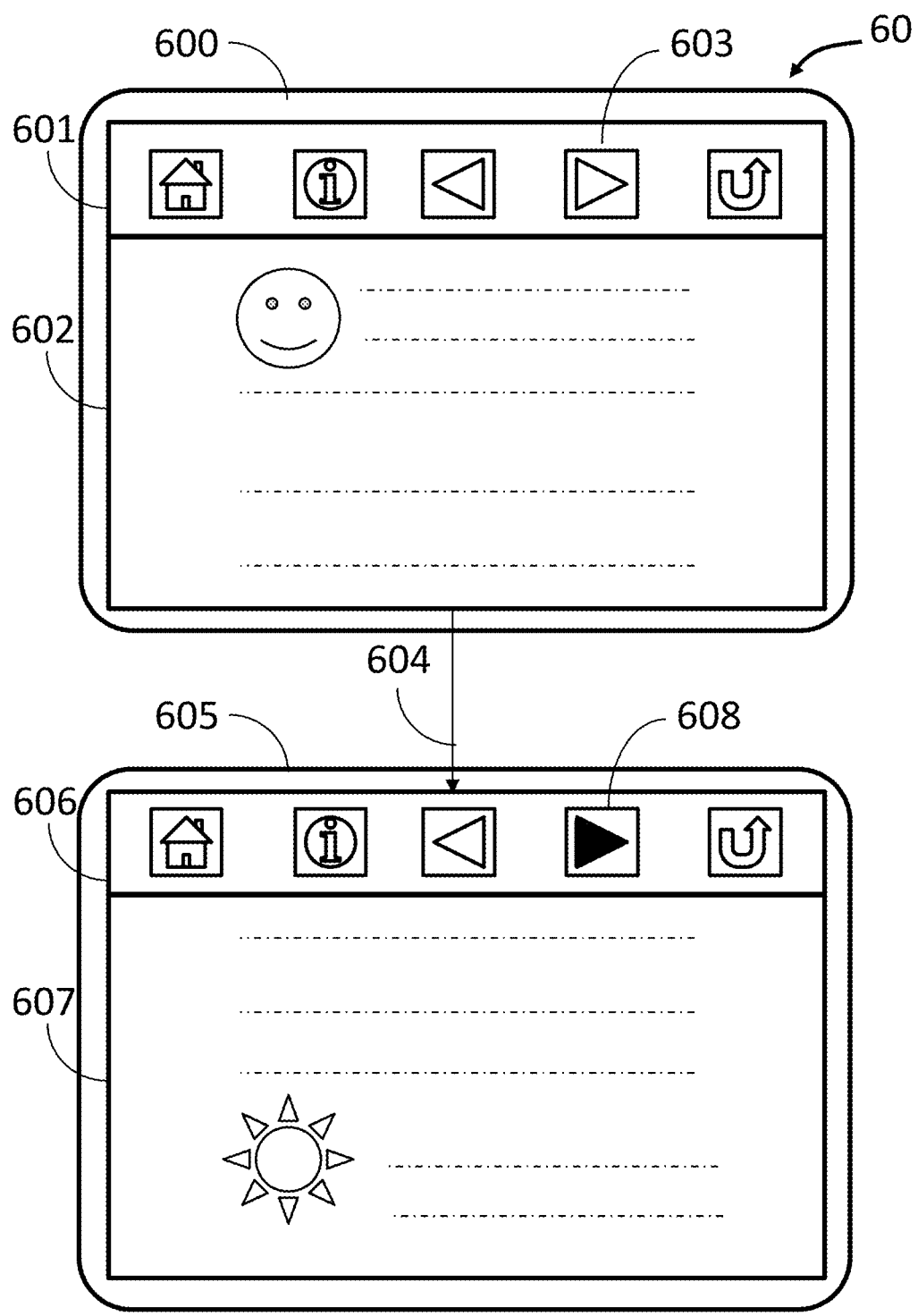
FIG. 6 illustrates other example displays of two other example consecutive image displays of an example video, in which images are simultaneously processed and displayed in non-overlaid manner, according to certain embodiments of the invention.

Referring to FIG. 6, other example displays 60 of two other example consecutive image displays 600, 605 each include two non-overlaid video windows 601 and 602, as to display 600, and windows 606 and 607, as to display 605. In the first of the image display 600, two separate videos, in respective windows 601, 602, are being concurrently processed/played and displayed in the display 600. Each of the videos has a respective one or more metadata segment associated with the frame of the applicable video of the respective window 601 or 602 of the display 600. The second image display 605 illustrates a click/touch action to the display 605 triggering a button 608 of the video window 606. Processing of the metadata segment(s) associated with the frame of video processed/played in the video window 606, on input to the button 608 (e.g., by click/touch), logically invokes (as per the metadata segment(s)) a different image display 605 (i.e., different frame) of the video in the window 607. In effect, the processed metadata segment(s), together with received input to the button 608, invokes a different image display 605 of the separate video in the window 606, as well. Thus, the window 606 of that separate video now displays a frame of the video that is the window 606 with highlighted button 608, and the window 607 of the other video displays a different frame of the other video that is the window 607 showing a different image for viewing from that of the window 602.

Figure 7:
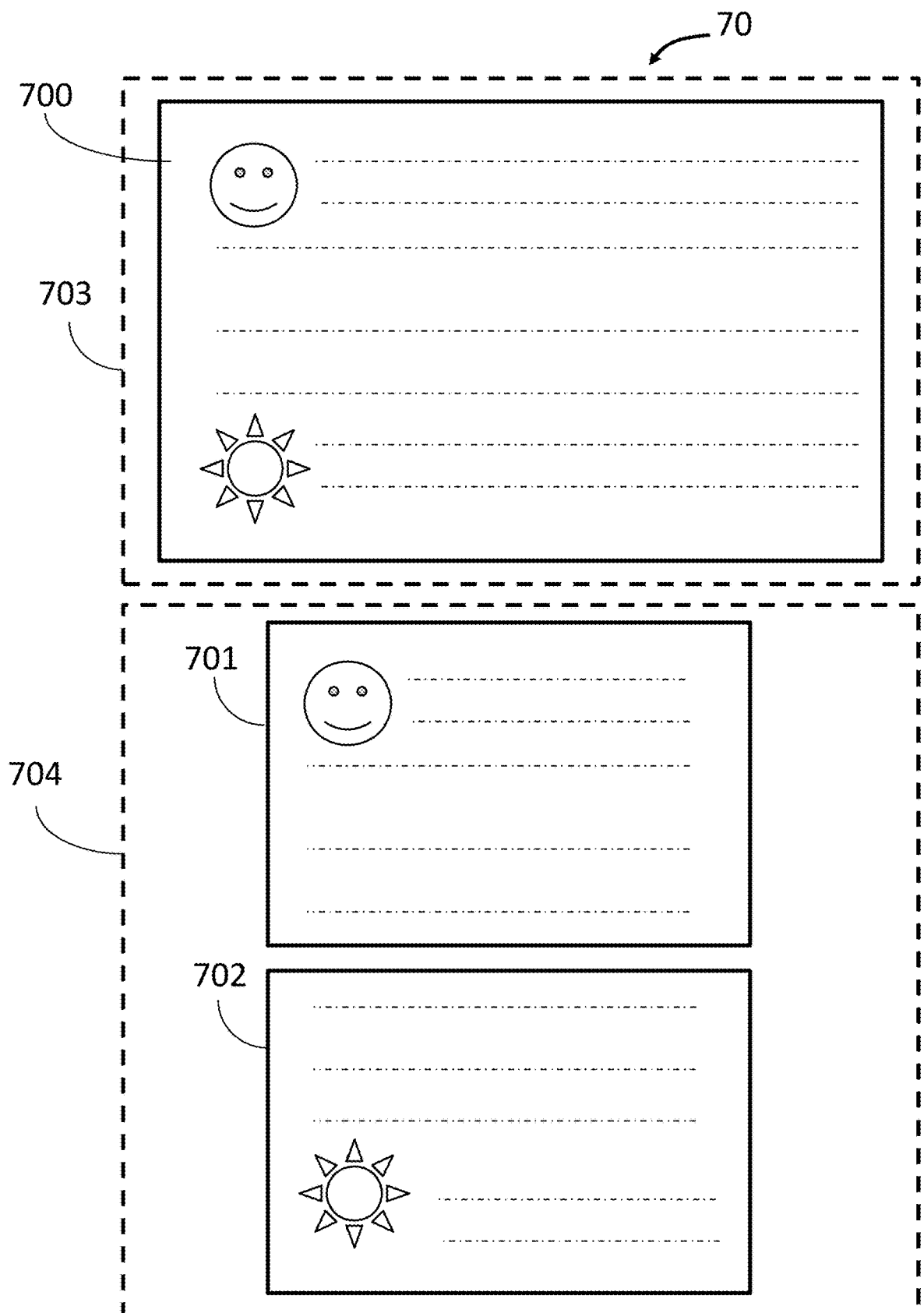
FIG. 7 illustrates an example of two different videos providing a single image, on the one hand, and two separate images, on the other hand, each of same content and formatted, respectively, for larger and smaller displays, according to certain embodiments of the invention.

Referring to FIG. 7, an example of two different videos provides a single image, on the one hand, and two separate images, on the other hand, each of same content but formatted for two differently sized (physical size) screen displays, respectively. A video 1 703 is comprised of one frame 700, and a video 2 704 is comprised of two frames 701 and 702. The video 1 703 was created, for example, for use on a larger (physically) screen display, and the video 2 704 was created, for example, for a smaller (physically) screen display. The frames 700, 701, 702 each include respective video segment and one or more metadata segments. In the example, all content is formatted to fit into a larger (physically) screen display where the video 703 for that larger screen display includes the single frame 700. Because all content cannot actually or desirably fit in a smaller (physically) screen display, the video 704 for the smaller screen display includes the two frames 701 and 702.

Figure 8:
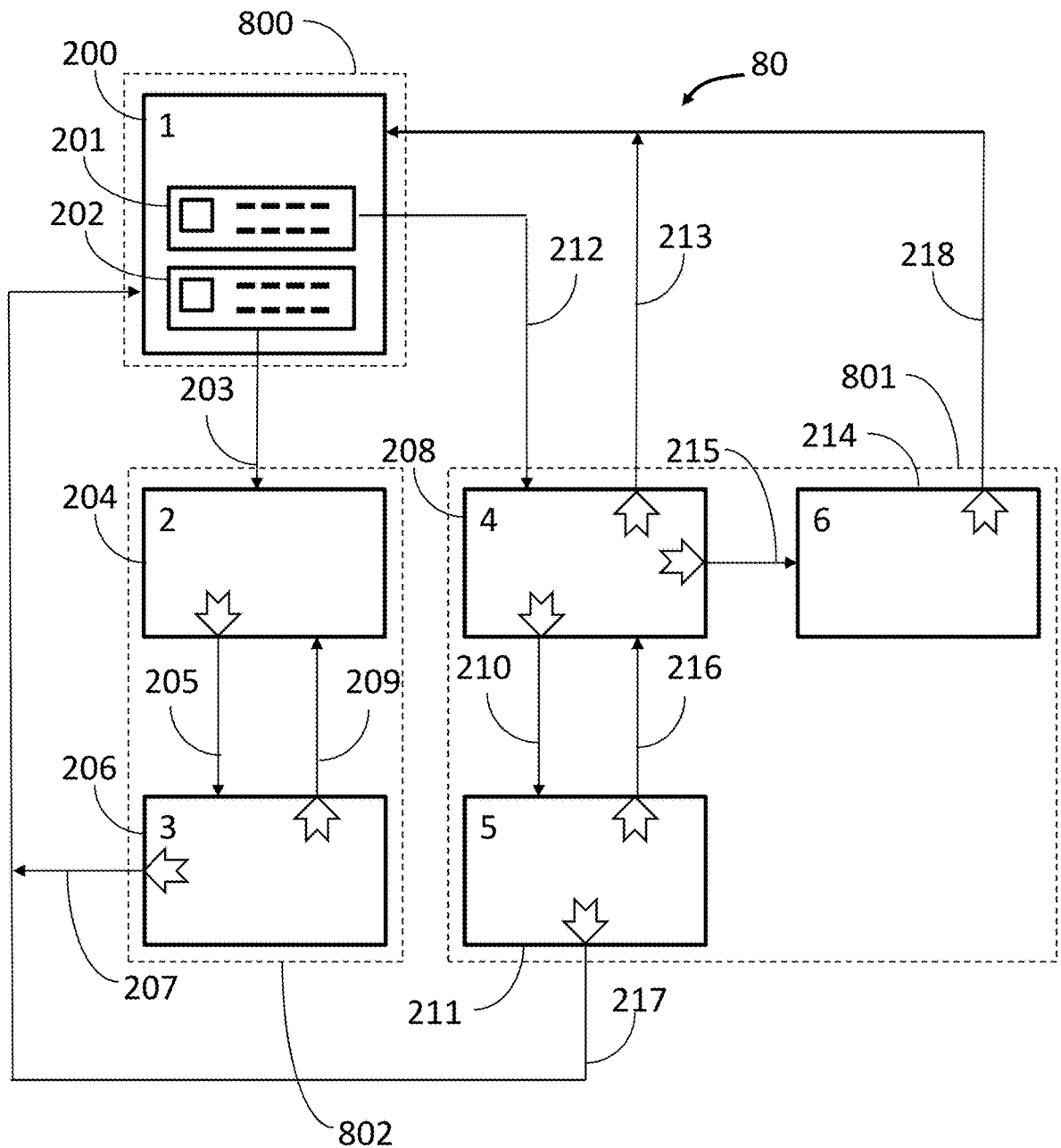
FIG. 8 illustrates an example series of successive displays for three separate example videos, including a manager video for access to others of the videos, according to certain embodiments of the invention.

Referring to FIG. 8, an example series of successive displays 80 for three separate videos include a first display set 800 (and related window images 200), a second display set 801 (and related window images 208, 211, 214) and a third display set 802 (and related window images 204, 206). In the example, each of display sets 800, 801, 802 depicts display for a separate respective video, a first video, second video and third video, respectively, that is processed and played by a player device. Referring back to FIG. 2 in conjunction with FIG. 8, FIG. 2 depicts the same images, however, the images of FIG. 8 result from three processed/played videos, whereas the images of FIG. 2 result from a single processed/played video. In FIG. 8, the first display set 800 includes the single window image 200 of the first video associated with the image 200. This window image 200 of the first video includes one or more associated metadata segment processed by the player device, responsive to input to the player device. For example, from the window image 200, an input (click, touch, etc.), per the particular metadata segment as processed for the first video and image 200, invokes the processing/play of another video associated with the display sets 801 or 802. The particular first video of the image 200 is a "manager" video, from which manager video the other videos (second video and/or third video) for the display sets 801 or 802 may be initiated (in accordance with particular metadata segment of and input associated with the video of the image 200). In the example, the second display set 802 of the second video includes two possible window images 204, 206, each with respective associated metadata segment that is processed together with device in puts for further action (e.g., change 205 from one image 204 to the other image 206, and vice versa 209, or change back to the first display set 800 of the original video). The third display set 801 (i.e., third video) includes three possible window images 209, 211 and 214, each with respective associated metadata segment(s) processed with any inputs to the player device for next action (e.g., change 210, 215, respectively, from image 208 to either image 211 or image 214, respectively; change 216 from the image 211 back to the image 208; or change 213, 217, 218, respectively, from any image 208, 211, 214, respectively, back to the image 200 of the display set 800). In the foregoing example, shifts between display sets 800, 801, 802 are effected by shift to another video (e.g., shift between first, second and third video), whereas each video may include more than one frame with associated metadata segment(s) that when processed and upon input will invoke subsequent frames for display, or the like.

Figure 9:
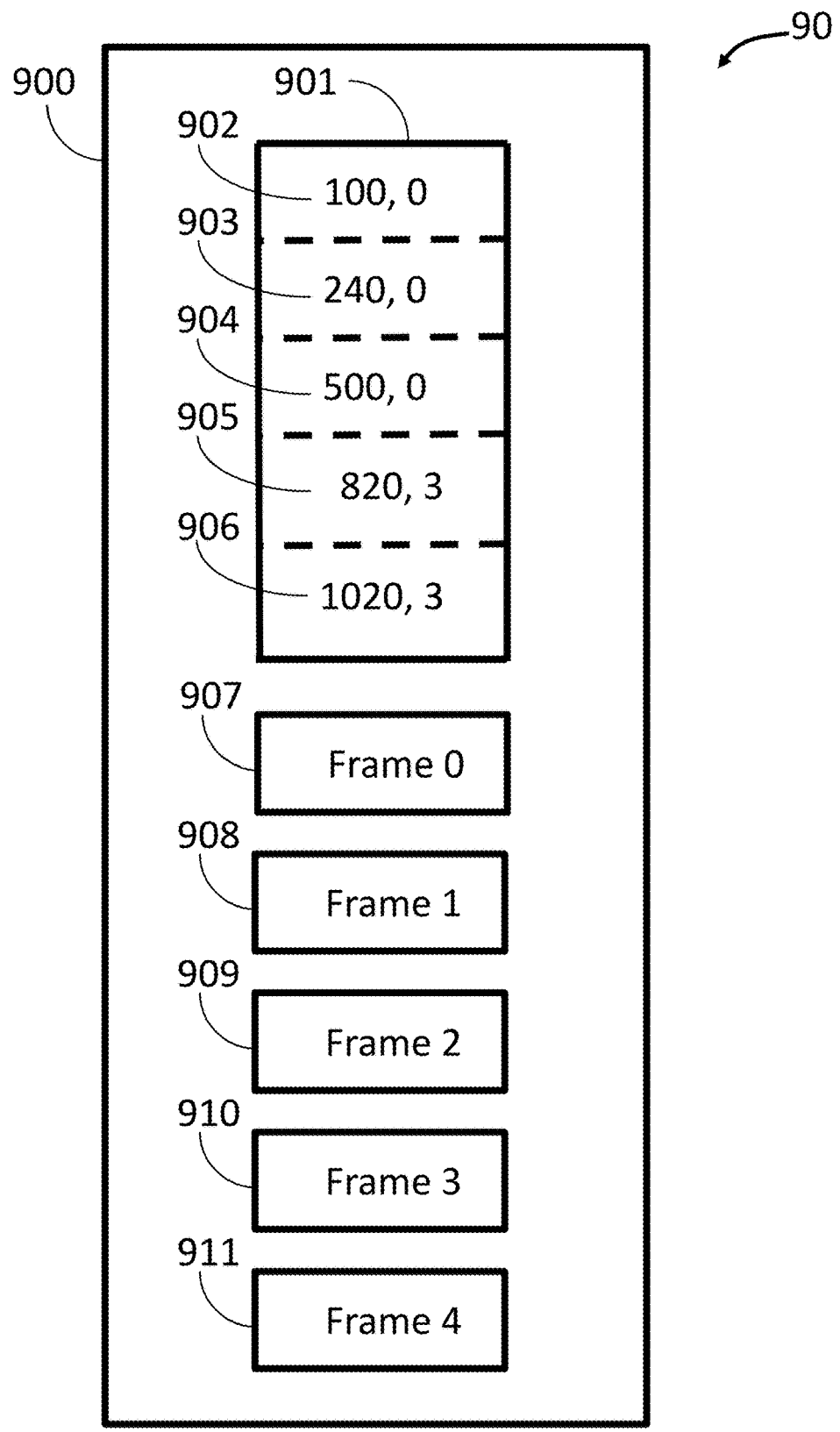
FIG. 9 illustrates an example video including headers and five video frames, according to certain embodiments of the invention.

Referring to FIG. 9, as mentioned, video encoding formats often have two types of video frames, I frames and P frames. The I frames can be decoded without reference to any other frames, and the P frames are decoded with reference to previously decoded I frames and P frames. The I frames take considerably more storage then P frames, therefore, more P frames and fewer I frames are desired for storage considerations. Nonetheless, to randomly access any given frame within a video, the previous I frames and also previous P frames must first be decoded.

A example of a typical video 900 includes headers 901 and five respective video frames 907, 908, 909, 910, 911. Each video frame 907, 908, 909, 910, 911 may contain multiple segments (as described with respect to FIG. 3), however, the frames 907, 908, 909, 910, and 910 are shown as single segments for purpose of explanation but not limitation. The headers 901 include a set of header segments 902, 903, 904, 905, 906, one segment for each respective frame. The header 901 in each segment 902, 903, 904, 905 or 906 contains code or instructors for randomly accessing respective ones of the video frames 907, 908, 909, 910, 911. For example, the first segment 902 is processed in access and display of the first video frame 902, the second segment 903 is processed in access and display of the second video frame 908, and so forth.

Each header segment 902, 903, 904, 905, 906 of the header 901 includes an offset device and an I frame number/identifier. The offset device is processed as representing a value associated with a particular video frame of the video. The I frame number/identifier identifies the particular video frame (which will have been encoded as an I frame) that must be read and decoded before reading and decoding the desired video frame. If the I frame number/identifier corresponds identically with the then-current frame (e.g., if the then-current frame is the first frame 907 and the I frame number/identifier identifies this first frame 907), then no additional frame (e.g., 908, 909, 910, 911) must then be read and decoded.

To read frame 0, the first segment 902 is read and contains, for example, units corresponding to the values 100 and 0. The unit corresponding to the value 100 is the offset device, such that the video frame 0 907 starts at offset 100. The unit corresponding to the value 0 represents a designator the particular frame that must first be read, if any. In the example, if the I frame number/identifier corresponds identically to the frame 0 907, no other frame must then be read. Based on the unit of the offset device corresponding to the value 100, the frame 0 is read, decoded and displayed.

If next (after the frame 0, or entry frame) the frame 4 911 is to be read, segment 906 of the header 901 is read. The segment 906 contains the I frame number/identifier of 3, in the example. The header segment 905 (i.e., for I frame number/identifier of 3) for the unit of the offset device is offset 820 (i.e., the I frame number/identifier of an I frame is always that frame's number). Using the unit of the offset device of 820, the frame 3 910 is read and decoded. After decoding the frame 3 910, the frame 4 911, corresponding to the unit of the offset device having offset 1020 (i.e., from segment 906), is read. The frame 4 911 is decoded and displayed. The I frames are always read and decoded, but never displayed.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system for interacting with a video, comprising:
a processor;
a video decoder communicatively connected to the processor;
a storage communicatively connected to the video decoder, the storage contains a video file having a header section and a plurality of video frames, each video frame of the plurality of video frames including a respective video segment and a respective metadata segment, wherein the respective metadata segment in each video frame includes one or more logical determinants, each of the one or more logical determinants is associated with a respective action type and a respective video frame identifier for logically selecting the respective video frame identifier of a respective video frame based on a respective action type included in a respective input received from an input device; and
the input device communicatively connected to the processor, wherein the processor, responsive to the input device, processes a video frame of the plurality of video frames and controls selection of another video frame of the plurality of video frames for the video decoder;
wherein the processor processes the respective metadata segment of the video frame to detect any input from the input device, and
(A) in response to an input is received by the processor from the input device corresponding to the respective metadata segment of the video frame, processing the input together with the respective metadata segment and performing an action of calling an alternative video frame for the video decoder and not calling a next successive video frame dictated by the header section, wherein the action of calling an alternative video frame for the video decoder is based on: (i) an action type of the input, (ii) the respective action type, and (iii) the respective video frame identifier of the alternative video frame included in the respective metadata segment of the video frame,
(B) in response to the input is not received by the processor from the input device corresponding to the respective metadata segment, processing a next successive video frame dictated by the header section and not calling the alternative video frame.

2. The system of claim 1, further comprising: a display communicatively connected to the processor, for displaying the video processed from the video file.

3. A method of processing a video file, the method comprising:
demultiplexing, by a demultiplexer, the video file including a plurality of video frames to obtain a first video frame of the plurality of video frames, the first video frame includes a video segment and a metadata segment, the first video frame includes a header, wherein each video frame of the plurality of video frames includes a respective metadata segment, the respective metadata segment comprises an action type and a video frame identifier for logically selecting the video frame identifier of another video frame of the plurality of video frames;
decoding, by a video decoder, the first video frame;
processing, by a processor, the video segment and the metadata segment of the first video frame responsive to receiving an input logically operative to the metadata segment;
displaying an image of the video segment based on the processing;
responsive to no input is received, selecting a second video frame of the plurality of video frames for the step of decoding by the decoder as dictated by the header; and
responsive to an input is received, selecting a third video frame of the plurality of video frames for decoding, by the decoder, wherein selecting the third video frame is based on: (i) an action type of the input, and (ii) action type and video frame identifier of the third video frame included in the metadata segment of the first video frame.

4. The method of claim 3, wherein the second video frame includes a video segment and a metadata segment, the second video frame also includes a second frame header, further comprising:
responsive to no input is received, selecting the third video frame for the step of decoding as dictated by the second frame header of the second video frame; and responsive to a second input is received, selecting a fourth video frame for decoding as dictated by the metadata segment of the second video frame processed with the second input.

5. The method of claim 4, wherein the step of selecting second video frame as dictated by the header of the first video frame, further comprising the step of repeating the steps of decoding, processing and displaying for the first video frame.

6. A system for displaying a video of successive images from a video file, the system comprising:
- a demultiplexer for splitting the video file into a plurality of video frames, each video frame of the plurality of video frames including a video segment and a metadata segment and a header;
- a decoder communicatively connected to the demultiplexer, for rendering each of the plurality of video frames for processing;
- a processor communicatively connected to the decoder, for processing the video segment and the metadata segment, respectively, of each video frame of the plurality of video frames;
- a display communicatively connected to the processor, for displaying each video segment of each video frame as successive images; and
- an input device communicatively connected to the processor, for receiving input operative to the processor in processing the metadata segment;
- wherein in response to no input is received, selecting a second video frame of the plurality of frames for the decoder as dictated by the header of video frame currently decoded by the decoder;
- wherein in response to an input is received, selecting a third video frame of the plurality of video frames for the decoder as dictated by the metadata segment processed with the input of the video frame currently decoded by the decoder, wherein the selecting of the third video frame is based on: (i) an action type of the input, and (ii) action type and video frame identifier of the third video frame included in the metadata segment of the video frame currently decoded by the decoder.

7. The system of claim 6, further comprising: a storage containing the video file communicatively connected to the demultiplexer, the video file is streamed from the storage to the demultiplexer.

8. The system of claim 6, further comprising: memory communicatively connected to the processor; wherein the memory contains the video file.

* * * * *